United States Patent [19]

Mick

[11] Patent Number: 4,547,797
[45] Date of Patent: Oct. 15, 1985

[54] APPARATUS FOR COLOR TRACKING AND BRIGHTNESS CORRECTION FOR MULTI-GUN COLOR CATHODE RAY TUBE DISPLAY

[75] Inventor: Perry J. Mick, Phoenix, Ariz.
[73] Assignee: Sperry Corporation, New York, N.Y.
[21] Appl. No.: 433,934
[22] Filed: Oct. 12, 1982
[51] Int. Cl.$^4$ ............................................. H04N 9/535
[52] U.S. Cl. ......................................... 358/27; 358/28
[58] Field of Search ....................... 358/27, 28, 39, 40

[56] References Cited

U.S. PATENT DOCUMENTS 4,361,850  11/1982  Nishimura ............................. 358/27
4,458,263  7/1984   Schutte ................................. 358/27

Primary Examiner—Richard Murray
Attorney, Agent, or Firm—Howard P. Terry; Arnold L. Albin

[57] ABSTRACT

An apparatus for color and brightness correction for a multi-gun color CRT display, providing compensation for variation in phosphor efficiency with cathode energization and for color tracking between guns. The brightness correction circuit is required to respond only to essentially DC changes, while a color selection circuit responds at a video rate. In a preferred digital embodiment, brightness and color tracking correction factors are stored in memory dedicated to a particular CRT, and addressed in response to input from a reference brightness level selected by an operator. A color selection decoder having stored in a second memory relative brightness characteristics of each color phosphor as a function of the hue commanded converts an input binary command to an analog output, which is combined with the brightness and color tracking correction factor to determine the resulting cathode energization for each color gun. In an analog embodiment, brightness and tracking corrections are performed by a logarithmic amplifier which applies an appropriate multiplier factor to the reference brightness level. Color selection is provided by a variable gain amplifier having gain control bias varied by a digital color decoder in proportion to the desired relative brightness levels. A hybrid system is also described combining digital memory storage for brightness and tracking correction and an analog variable gain amplifier for relative brightness compensation, using the circuits described above.

12 Claims, 15 Drawing Figures

ANALOG COLOR SELECTION RESISTOR VALUES

| BINARY COLOR CODE | OUTPUT LINE | RED VIDEO AMPLIFIER | | GREEN VIDEO AMPLIFIER | | BLUE VIDEO AMPLIFIER | |
|---|---|---|---|---|---|---|---|
| | | R (OHMS) | $A_{r2}=1k\Omega/R$ | R (OHMS) | $A_{g2}=1k\Omega/R$ | R (OHMS) | $A_{b2}=1k\Omega/R$ |
| 0001 Red | (a) | 95.3 | 10.49 | — | — | — | — |
| 0010 Orange | (b) | 102 | 9.804 | 165 | 6.061 | — | — |
| 0011 Yellow | (c) | 118 | 8.475 | 124 | 8.065 | 324 | 3.086 |
| 0100 Green | (d) | — | — | 121 | 8.264 | — | — |
| 0101 Blue | (e) | — | — | — | — | 95.3 | 10.49 |
| 0110 Magenta | (f) | 102 | 9.804 | — | — | 169 | 5.914 |
| 0111 White | (g) | 143 | 6.993 | 127 | 7.874 | 162 | 6.173 |
| 1000 Sky Blue | (h) | — | — | 174 | 5.747 | 174 | 5.747 |
| 1001 Brown | (i) | 169 | 5.914 | 267 | 3.745 | 499 | 2.004 |
| 1100 Green | (j) | — | — | 121 | 8.264 | — | — |
| 1101 Yellow | (k) | 102 | 9.804 | 121 | 8.264 | — | — |
| 1110 Red | (m) | 95.3 | 10.49 | — | — | — | — |

0XXX Colors are stroke display
1XXX Colors are raster display

FIG. 5

| SAMPLE MEMORY DATA FOR BRIGHTNESS AND COLOR TRACKING CORRECTION ||
|---|---|
| Input address to prom (decimal) m | Output data from prom (decimal) n |
| 0 | 0 |
| 1 | 3 (2.518) |
| 2 | 4 (4.487) |
| 3 | 6 (6.291) |
| 4 | 8 |
| 5 | 10 |
| 6 | 11 |
| 7 | 13 |
| 8 | 14 |
| 9 | 16 |
| 10 | 17 |
| 11 | 19 |
| 12 | 20 |
| 13 | 21 |
| 14 | 23 |
| 15 | 24 |
| 16 | 25 |
| ⋮ | ⋮ |
| 125 | 141 |
| 126 | 142 |
| 127 | 143 |
| 128 | 144 |
| ⋮ | ⋮ |
| 250 | 251 |
| 251 | 252 |
| 252 | 253 |
| 253 | 253 |
| 254 | 254 |
| 255 | 255 |

FIG. 7.

| PROM COLOR CODE FOR DIGITAL COLOR SELECT | | | | | | |
|---|---|---|---|---|---|---|
| Color Code | | Red Prom | | Green Prom | | Blue Prom |
| Video | CB3-CB0 | c | $A_{r2}=.031c$ | c | $A_{g2}=.031c$ | c | $A_{b2}=.031c$ |
| 0 | 0000 off | 0 | 0 | 0 | 0 | 0 | 0 |
| 0 | 0001 off | 0 | 0 | 0 | 0 | 0 | 0 |
| 0 | 0010 off | 0 | 0 | 0 | 0 | 0 | 0 |
| 0 | 0011 off | 0 | 0 | 0 | 0 | 0 | 0 |
| 0 | 0100 off | 0 | 0 | 0 | 0 | 0 | 0 |
| 0 | 0101 off | 0 | 0 | 0 | 0 | 0 | 0 |
| 0 | 0110 off | 0 | 0 | 0 | 0 | 0 | 0 |
| 0 | 0111 off | 0 | 0 | 0 | 0 | 0 | 0 |
| 0 | 1000 off | 0 | 0 | 0 | 0 | 0 | 0 |
| 0 | 1001 off | 0 | 0 | 0 | 0 | 0 | 0 |
| 0 | 1010 off | 0 | 0 | 0 | 0 | 0 | 0 |
| 0 | 1011 off | 0 | 0 | 0 | 0 | 0 | 0 |
| 0 | 1100 off | 0 | 0 | 0 | 0 | 0 | 0 |
| 0 | 1101 off | 0 | 0 | 0 | 0 | 0 | 0 |
| 0 | 1110 off | 0 | 0 | 0 | 0 | 0 | 0 |
| 0 | 1111 off | 0 | 0 | 0 | 0 | 0 | 0 |
| 1 | 0000 black/off | 0 | 0 | 0 | 0 | 0 | 0 |
| 1 | 0001 red | 255 | 7.843 | 0 | 0 | 0 | 0 |
| 1 | 0010 orange | 237 | 7.289 | 187 | 5.752 | 0 | 0 |
| 1 | 0011 yellow | 204 | 6.274 | 247 | 7.597 | 0 | 0 |
| 1 | 0100 green | 0 | 0 | 255 | 7.843 | 0 | 0 |
| 1 | 0101 blue | 0 | 0 | 214 | 6.582 | 173 | 5.321 |
| 1 | 0110 magenta | 239 | 7.351 | 0 | 0 | 145 | 4.459 |
| 1 | 0111 white | 169 | 5.198 | 241 | 7.413 | 150 | 4.614 |
| 1 | 1000 sky blue | 0 | 0 | 214 | 6.582 | 173 | 5.32 |
| 1 | 1001 brown | 175 | 5.383 | 141 | 4.337 | 60 | 1.845 |
| 1 | 1010 purple | 202 | 6.213 | 0 | 0 | 193 | 5.936 |
| 1 | 1011 off | 0 | 0 | 0 | 0 | 0 | 0 |
| 1 | 1100 green | 0 | 0 | 255 | 7.843 | 0 | 0 |
| 1 | 1101 yellow | 240 | 7.382 | 255 | 7.843 | 0 | 0 |
| 1 | 1110 red | 255 | 7.843 | 0 | 0 | 0 | 0 |
| 1 | 1111 black/off | 0 | 0 | 0 | 0 | 0 | 0 |

FIG. 8.

HYBRID, COLOR SELECTION RESISTOR VALUES

| BINARY COLOR CODE | RED VID. AMP. (OHMS) | GREEN VID. AMP. (OHMS) | BLUE VID. AMP. (OHMS) |
|---|---|---|---|
| 0001 Red | 590 | – | – |
| 0010 Orange | 681 | 1K | – |
| 0011 Yellow | 866 | 634 | 3.24K |
| 0100 Green | – | 390 | – |
| 0101 Blue | – | 768 | 1.13K |
| 0110 Magenta | 681 | – | 1.43K |
| 0111 White | 1.18K | 649 | 1.37K |
| 1000 Sky Blue | – | 1.07K | 1.50K |
| 1001 Brown | 1.43K | 1.91K | 5.28K |
| 1100 Green | – | 590 | – |
| 1101 Yellow | 681 | 590 | – |
| 1110 Red | 590 | – | – |

0XXX Colors are stroke display
1XXX Colors are raster display

FIG. 12.

APPARATUS FOR COLOR TRACKING AND BRIGHTNESS CORRECTION FOR MULTI-GUN COLOR CATHODE RAY TUBE DISPLAY

BACKGROUND OF THE INVENTION

1. Field of the Invention

The present invention relates generally to color cathode ray tube (CRT) display apparatus and more particularly to gamma factor correction to automatically and independently adjust the cathode drive voltage of the cathode for each of the color phosphors in accordance with each of the phosphor's light emissive characteristics at a variable reference brightness.

2. Description of the Prior Art

In most prior art color CRT display systems employing a multi-gun CRT, such as, for example, home and commerical television receivers, where normal viewing ambient light conditions do not vary significantly, essentially fixed predetermined drive voltages for the red, green, and blue cathodes are used. Thus, any change in the manual brightness setting will cause only a DC shift while maintaining the same relative voltages applied to the CRT. However, since the color gun response is a nonlinear function of the applied DC cathode voltage, the relative color balance of a multi-gun structure is disturbed. Thus, to restore the proper color balance, compensating readjustments of the drive to the red, green, and blue guns individually are necessary. In the applications just described, since the adjustments are normally made over relatively narrow ranges of ambient light conditions, the color shift is slight and generally not corrected. Similarly, the automatic brightness function found on commercial television receivers affects the drive of all three guns in identically the same manner and has no feature to compensate the relative shift in color balance, but again the restricted operating range keeps the error from being objectionable. However, these conventional color CRT brightness controls, whether automatic, manual, or both, are unsuitable for critical applications of color CRTs such as where used to display information in an aircraft cockpit environment, wherein the ambient light level may vary uncontrollably over wide ranges, requiring readjustment of the display brightness over a wide range.

Conventionally, a multi-gun CRT, such as the shadow-mask type, includes red, green, and blue cathodes for emitting the three electron beams which excite the corresponding red, green, and blue phosphor triads through the screen apertures, the output light intensity of each phosphor, in Foot-Lamberts, varying in accordance with the spectral response of any filter on the screen, and non-linearly in accordance with the voltage applied to each cathode in a determinable manner, such ratio being a function of a brightness factor known as gamma ($\gamma$) for each primary color, and which may be a variable from tube to tube as well as color to color.

Therefore, in order to maintain a given color hue or chromaticity over the entire color spectrum and brightness range, the relative intensity of each primary color component must be varied in accordance with its particular gamma characteristic. In addition it has been found necessary to modify each color hue component in accordance with the square of the video driving voltage to provide color tracking.

One example of an automatic color correction and brightness tracking device is in U.S. application Ser. No. 304,451, filed June 22, 1981 and assigned to the Assignee of the present invention. The invention therein discloses an apparatus for automatically sensing and correcting for ambient brightness levels and display writing modes, for calculating the corresponding brightness level required for each of the primary color components of a commanded color, and for determining the required drive voltages to the cathode ray tube cathodes. These operations require a relatively sophisticated microprocessor control system and an associated personality programmable-read-only-memory (PROM) containing the color-brightness characteristics of the particular cathode ray tube to which it is dedicated. While capable of a wide range of brightness in color tracking correction, relatively complex circuitry is required for mathematical computations control, and storage. The complexity of the prior art disclosure was necessitated in part by the need to operate and perform the gamma and contrast corrections at a video pulse rate in the megaHertz range.

The present invention performs the function of correcting for the color gun non-linearity while keeping cost and complexity to a minimum by avoiding the need to perform non-linear corrections and mathematical computations at video speeds, thus permitting relatively simple operational amplifiers for an analog system, and permitting relatively simple analog-digital and digital-analog converters and storage for a digital correction control system. A hybrid system comprised of analog color selection and digital color correction is also described.

SUMMARY OF THE INVENTION

The present invention overcomes the disadvantages of the prior art by requiring neither a program-controlled microprocessor nor color correction at video rates. Since it is recognized that the brightness and color tracking parameters are essentially constant for a given color gun, and the reference brightness level is varied at infrequent intervals, simple analog or digital storage techniques may be used to apply a color correction factor to the cathode energization driving voltage.

Thus, one embodiment of the present invention comprises a cathode ray tube with at least two color guns, a reference display brightness control for setting variable brightness energization levels, a video color decoder for commanding the predetermined color components of the primary colors at their required relative brightness levels, an analog amplifier which applies a correction factor proportional to the required brightness signal, and a linear amplifier having a variable gain responsive to the relative brightness commanded by the color decoder, such that a color gun cathode is energized in proportion to the predetermined brightness corresponding to the image and predetermined color display providing a color correction for the phosphor emissivity response and color tracking between guns, as brightness reference level is varied.

BRIEF DESCRIPTION OF THE DRAWINGS

FIG. 5 is a table showing typical selected resistor values for determining video amplifier gain for color selection and analog brightness and color tracking correction system of FIG. 2.

FIG. 7 is a table listing sample brightness and color tracking PROM memory data, as used in the digital system.

FIG. 8 is a table listing color select PROM data for the digital embodiment of FIG. 6.

FIG. 12 is a table showing typical selected resistor values for determining video amplifier gain for color selection in a hybrid digital-analog color selection and brightness tracking correction system.

DESCRIPTION OF THE PREFERRED EMBODIMENT

Figure 1:
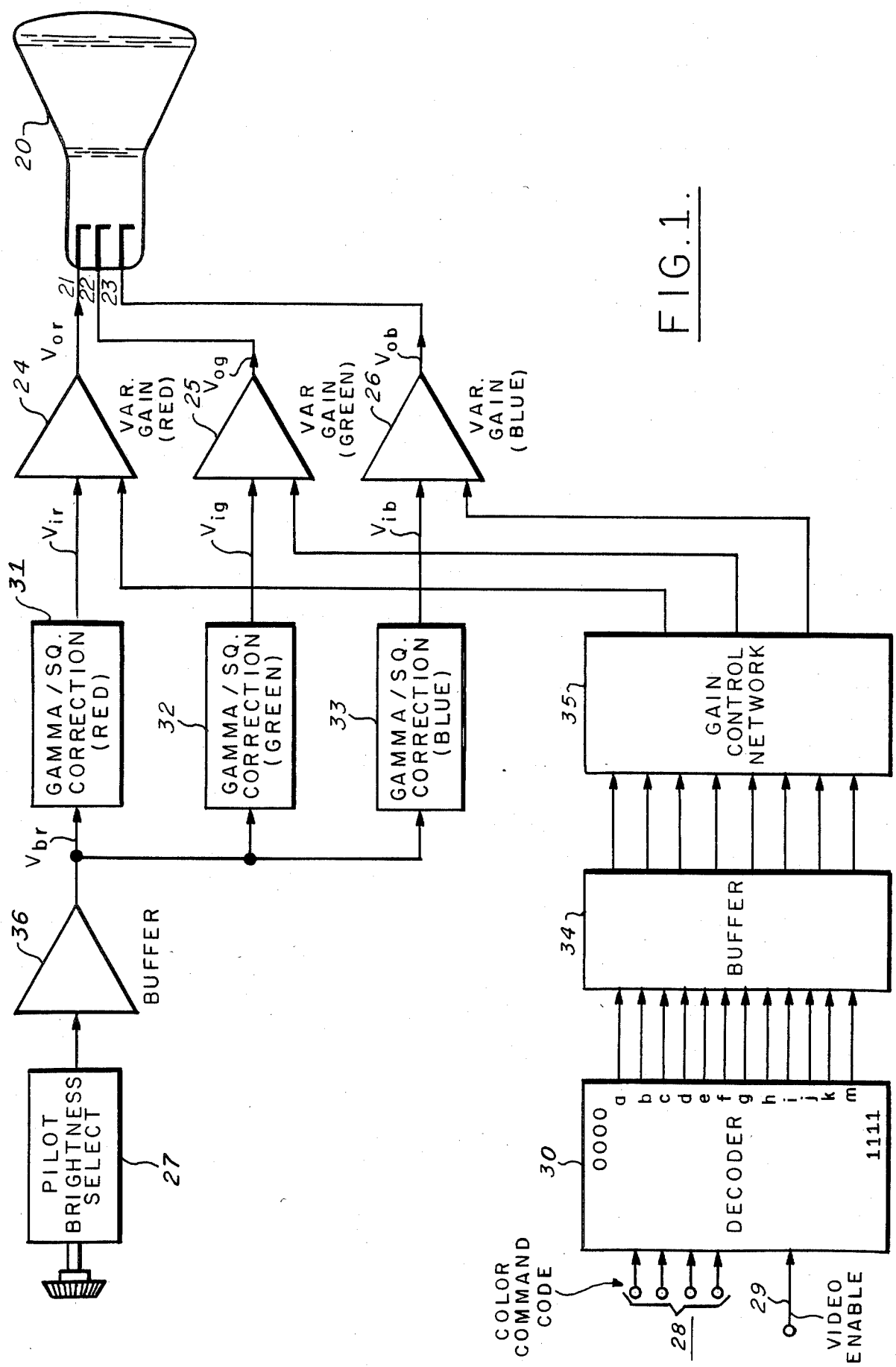
FIG. 1 is a block diagram of a preferred embodiment of the invention showing the electrical components thereof and their interconnections and interface with the external color command system.

A typical electronic flight instrument system for an aircraft usually comprises two basic units; a display unit mounted in the aircraft cockpit and a symbol generator unit normally mounted in the aircraft's electronics bay, the former displaying the flight control, flight navigation, and annunciation or status information generated by the symbol generator. Multiple identical display units may be employed, each displaying the desired flight data, such as a primary flight display (attitude, flight director, etc.) and a navigation display (map, weather, radar, etc.) which may be driven by a single symbol generator. Multiple display units (pilot's and copilot's instruments) may also be driven by dual symbol generators, suitable switching control panels being provided for any desired manual and/or automatic cross switching between symbol generators and display units. The present invention is applicable, in general, to any color CRT subjected to wide ranges of ambient light conditions. The display unit of such an overall system is the subject of the present invention. More specifically, since a CRT color gun must be corrected for the nonlinearity of its brightness output with respect to changes in driving energization, as well as individual production differences between color guns of a single tube or production units of individual display systems, and for color tracking with change in brightness, the apparatus of the present invention adapts the pilot's selected brightness of each display unit to such conditions.

In a color cathode ray tube of the type used for a display apparatus, a multiplicity of different but predetermined colors must be provided. Each color produced on the face of the cathode ray tube is composed of one, two, or three components of the primary colors red, green, and blue, with each of the colors being predetermined by the relative intensity of each of its primary components. These relative intensities may also take into consideration the variances in brightness perception of the human eye when perceiving different colors in the visible spectrum. When operated under a wide range of ambient light conditions, such as in an aircraft cockpit, provision must be made for varying the average brightness of the display, as well as of the individual primary color components. The light output of a particular color phosphor has a unique non-linear brightness versus cathode voltage characteristic, such characteristic varying from gun-to-gun and from tube-to-tube. Further, in order that the colors track, that is, maintain a constant hue as the average brightness level is changed, it is desirable that the brightness output of each individual cathode be proportional to the square of the applied reference voltage.

The present invention is a brightness correction system for the video color guns of a color cathode ray tube, as in the shadow mask type, for example. The video drive voltage to each gun of the CRT is altered non-linearly to take into account an exponential gamma factor, peculiar to each gun, and such that each color gun has a brightness output proportional to the square of an input brightness reference voltage. While color selection is performed at video speeds, the actual non-linearity correction does not have to operate at video speeds since it follows the reference brightness level, typically from a manual control. The present invention permits colors to track over the entire brightness range, and individual color gun gain adjustment assures that all colors will be the same among all display units.

Three embodiments are disclosed, including (1) an analog system using logarithmic gain characteristic amplifiers for brightness and color tracking correction and variable gain linear operational amplifiers for color selections, (2) a digital system in which the gamma correction, squaring correction, and color selection data are stored in memory requiring digital-to-analog and analog-to-digital circuitry, and (3) a hybrid system with digital brightness and tracking correction and analog color selection. The digital system and corresponding digital elements of the hybrid system improve on the prior art by treating the brightness reference level as an essentially DC value, thereby allowing all mathematical corrections to be predetermined, which avoids the need for microprocessor control and dynamic mathematical computations at video frequency, which require more complex and faster responding circuitry. A color tracking and brightness correction control apparatus embodying the principles of the present invention comprises a color cathode ray tube with a screen for emitting images in a plurality of colors as determined by the cathode energization applied to each color gun, a reference brightness control, a color correction circuit energized by the brightness control with an output proportional to the exponential factor $2/\gamma$, where the correction may be performed by nonlinear amplification of the reference brightness signal, and operable at substantially less than video rates, a digital decoder responsive to digital input color selection signals operating at a video rate, and a variable gain linear amplifier circuit, coupled to the decoder through an array of resistors, controlled by the decoder, so as to vary the gain of the linear amplifier circuit in a manner calculated to provide the correct relative brightness of each color gun for any selected hue over the full range of CRT brightness. Preparatory to the operation of the apparatus, each non-linear amplifier is adjusted for a gain factor corresponding to the gamma factor of its associated color gun, which normalized gun-to-gun differences in phosphor response. Alternatively, the required gain corrections may be stored in digital memory for recall in response to the setting of the reference brightness control level. Thus, the overall brightness level of the display will be determined by the reference brightness control level, with predetermined nonlinear correction factors.

A second input to the CRT is a video rate color selection signal, operating, for example at 6-12 Mhz. This signal will change the cathode energization relative to the corrected reference brightness level so as to maintain the selected hues in the display. In the analog system, a variable gain amplifier for each gun is coupled to a preselected array of gain control resistors, selected to maintain the correct relative brightnesses between primary colors for preselected colors from a group selected for raster or stroke display, and responsive to color command through the color decoder. The overall system gain of each amplifier is preadjusted to correct for CRT gun-to-gun differences. In the digital embodiment, the color command addresses a digital memory storing therein the binary words corresponding to the desired relative brightness levels for each color gun and hue. The selected binary word is converted to an analog value and combined with the brightness and color correction reference level to determine the cathode driving energization.

Thus, the cathode voltage is modulated by two inputs: the corrected reference brightness level and the color selection signal. The gains of the nonlinear and linear amplifier stages, in the analog embodiment, and any corresponding digital correction circuits in its digital embodiment, are calculated to provide a brightness level which maintains the correct relative brightness between guns, thus determining correct color tracking as a function of variable brightness and hue.

FIG. 1 illustrates those portions of the display unit pertinent to the color brightness tracking apparatus of the present invention. It will be appreciated that in the interest of clarity and brevity related but conventional CRT apparatus such as deflection coils and their associated electronics, focus controls, convergence assembly and controls, power supplies and the like have been omitted. Conventionally, a shadow-mask type CRT 20 includes a red, green, and blue cathode 21, 22, and 23 respectively, for emitting the three electron beams which excite the corresponding red, green, and blue phosphor triads through the screen apertures, the filtered output light intensity of each phosphor, in Foot-Lamberts, varying in accordance with the voltage applied to each cathode in a determinable manner, such ratio being referred to as the gamma ($\gamma$) for each primary color and which may vary from tube-to-tube and gun-to-gun. The red, green, and blue cathode drive voltages are supplied from corresponding video amplifiers 24, 25, and 26.

To provide tracking for maintaining color balance between the color guns as brightness is varied, it has been found that if the brightness output of the CRT for each cathode is made proportional to the square of the control brightness voltage color tracking correction will be accomplished over the full range of brightness from blanked display to maximum brightness. Correction of the gamma characteristic may be accomplished along with tracking correction by selection of an appropriate factor of proportionality by which the reference brightness control signal is modified.

Addressing FIG. 1, the basic video drive command 28, and 29 is supplied from a digital symbol generator, not shown, to a digital color command decoder 30. A typical digital format for the video command from the symbol generator is a four bit binary word 28 which can provide for sixteen different colors (including video blanking as black). An additional bit 29 is used to "enable" the decoder. The video command is used to address red, green, and blue variable gain video amplifiers 24, 25, and 26 via decoder output lines a through m, the details of which will be discussed below, the digital outputs of decoder 30 being converted to analog red, green, and blue cathode drive voltages to produce the desired or commanded color and intensity of the symbols drawn on the tube face by the deflection system.

The present invention is applicable both to display systems wherein the symbol generator drives two or more separate display units or only one display unit. It is also applicable to display systems involving one or more displays which are all raster written or all stroke written or both raster and stroke written. Thus, the video command signal illustrated in FIG. 1 may be a stroke or raster command signal.

In accordance with the teachings of the present invention, the display unit of FIG. 1 further includes brightness and tracking correction circuits 31, 32, and 33, unique to the display unit's specific CRT guns, and adapts the displayed symbology or information to the pilot at the brightness level he has manually selected, and thereafter adjusts the individual color cathode drives to maintain the originally commanded color over the entire selected brightness range. The brightness correction circuits 31, 32, and 33 adjust the tube's output brightness versus cathode drive voltage characteristic for each color phosphor while the variable gain circuits 24, 25, and 26 in cooperation with decoder 30, buffer 34, and gain control network 35 adjust the color intensity factors for each selected color.

Figure 10:
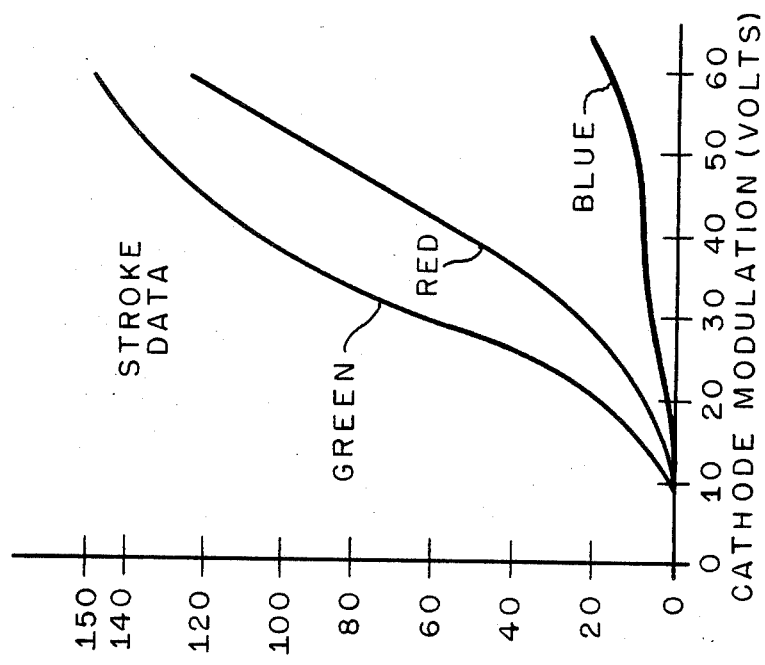
FIG. 10 is similar to FIG. 9, except for a stroke display.
Figure 9:
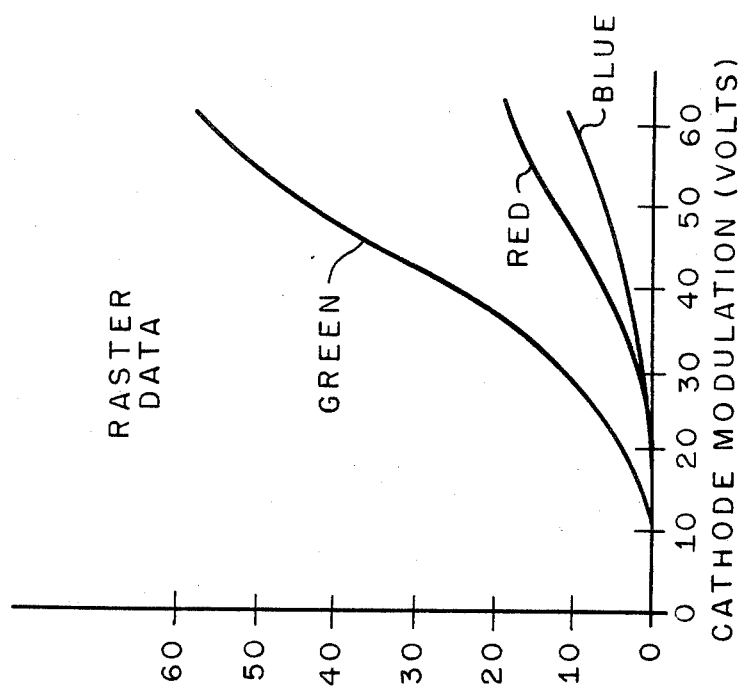
FIG. 9 is a curve of brightness output as a function of cathode energization for the three color guns of a color CRT, using raster display.

The display system is calibrated by measuring the brightness output, including any filters, of each of its primary color phosphors for a plurality of cathode voltages applied to each color's cathode and if the symbology is to be stroke and raster written, separate measurements must be made for each writing technique. Conventional optical equipment may be used for this purpose and on a production basis the curve plotting may be automatic. The result of such measurements of a typical CRT is illustrated in FIGS. 9 and 10. Note that stroke written symbology is much brighter than raster written symbology for the same cathode voltages. This is due to the much slower beam deflection rates required to draw stroke written symbols than that required to draw raster written symbols.

The brightness versus cathode drive voltage curves are analyzed and a number of points on each curve are selected, each of which represents the specific drive voltage required to produce a corresponding symbol, color and brightness. Since the human eye responds logarithmically, the selected points should be distributed logarithmically; that is, the points along the brightness axis should be closer together at low brightness and spread out at higher brightnesses in exponential fashion.

After all curve points have been established, the characteristic curve for each cathode primary color is mathematically determined by fitting the data points to the equation: Brightness=Drive Voltage raised to the exponential gamma ($B = Kv^\gamma$). This determines a fixed number for gamma that can be used to adjust a gain circuit in the analog embodiment, as will be explained later. The curves of FIGS. 9 and 10 are not tracked exactly by the relationship just defined, since the exponential gamma changes slightly as drive voltage is increased. The digital embodiment of the gamma-square correction can take this into account, as will be shown below, to provide a more precise fit to the experimental valves. The gains corresponding to cathode drive voltages for all three primary color components for all commandable colors for both stroke and raster writing modes are then assembled in color/gain tables, as in FIG. 5 for an analog embodiment. Since the input of each amplifier 24, 25, and 26 of FIG. 1 is derived from an adjustable brightness reference voltage, modified by a factor proportional to the brightness-out-to-cathode voltage characteristic of the CRT gun, and by a gain factor proportional to the color selected, the over-all cathode voltage is a function of both the gamma-square correction factor and the input video color command. The individual color command amplifier gains are obtained by appropriate selection of a gain determining resistor, also shown in FIG. 5, for the analog color and brightness correction system of FIG. 2. These values are independent of tube-to-tube diffrnces. FIG. 12 shows a corresponding table for a hybrid digitally controlled color selection system.

As noted heretofore, the invention is capable of embodiment in analog (FIG. 2), digital (FIG. 6) and hybrid configurations, (FIG. 12). Referring once again to FIG. 1, a block diagram of the analog embodiment of the brightness correction and color selection circuitry is shown. An initial setting of a brightness control 27, which may be a manual control accessible to the display operator, establishes a reference brightness level $V_{br}$. $V_{br}$ denotes the reference display brightness energizing voltage at the input to correction circuitry 31, 32, and 33. Other suitable sensors or control devices, such as a photosensor responsive to the ambient lighting, may also be used. The brightness control 27 is used to set the nominal display brightness over its range from blanked to full brightness. It is preferably followed by a buffer amplifier 36 which provides a DC output voltage ranging typically from 0 VDC to +10 VDC. It should be noted that 0 VDC represents a fully blanked CRT display, while +10 VDC represents a CRT display at maximum brightness. The imputs to three correction circuits 31, 32, and 33, one for each color red, green, and blue, are connected in parallel and driven by the output of buffer 36.

Figure 2A:
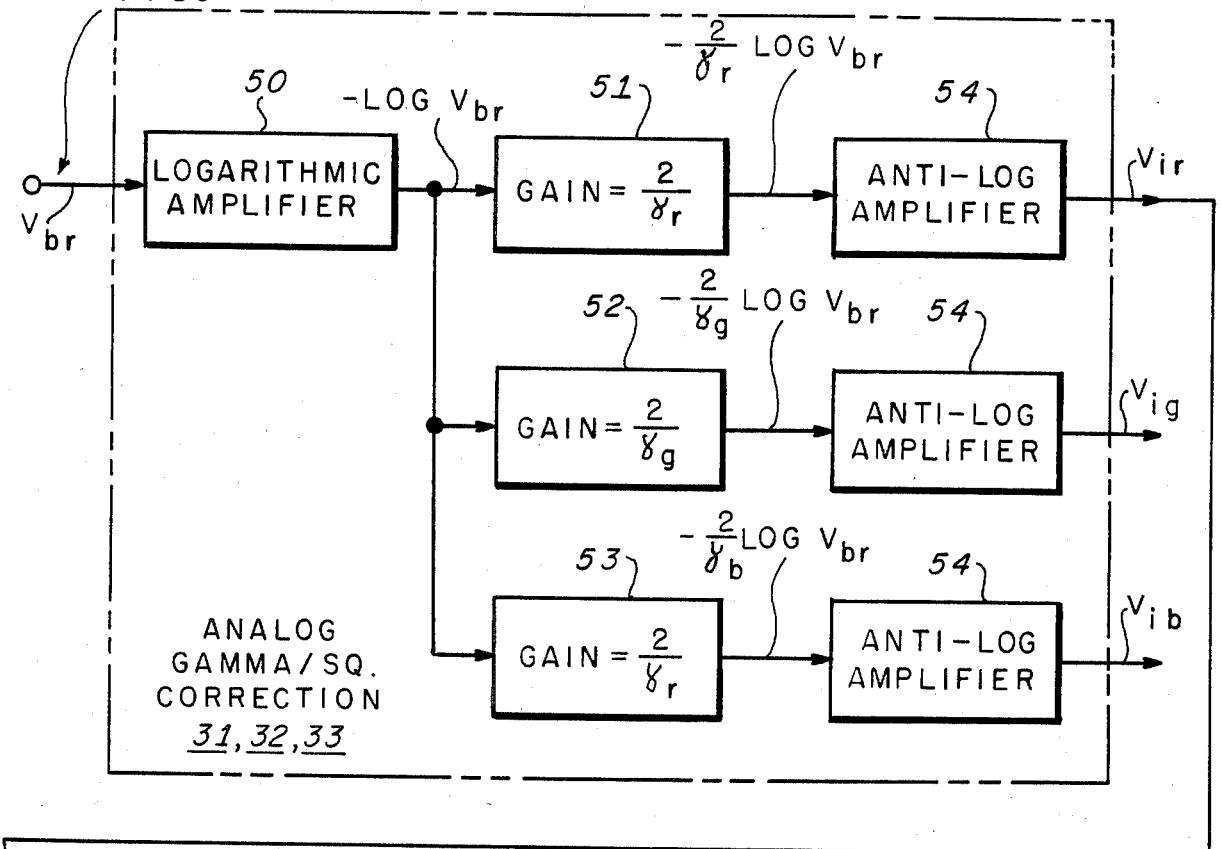
FIGS. 2a and 2b composite block and schematic diagrams showing an analog brightness and color tracking correction amplifier and variable gain color selection video amplifier as employed in the embodiment of FIG. 1.
Figure 2A:
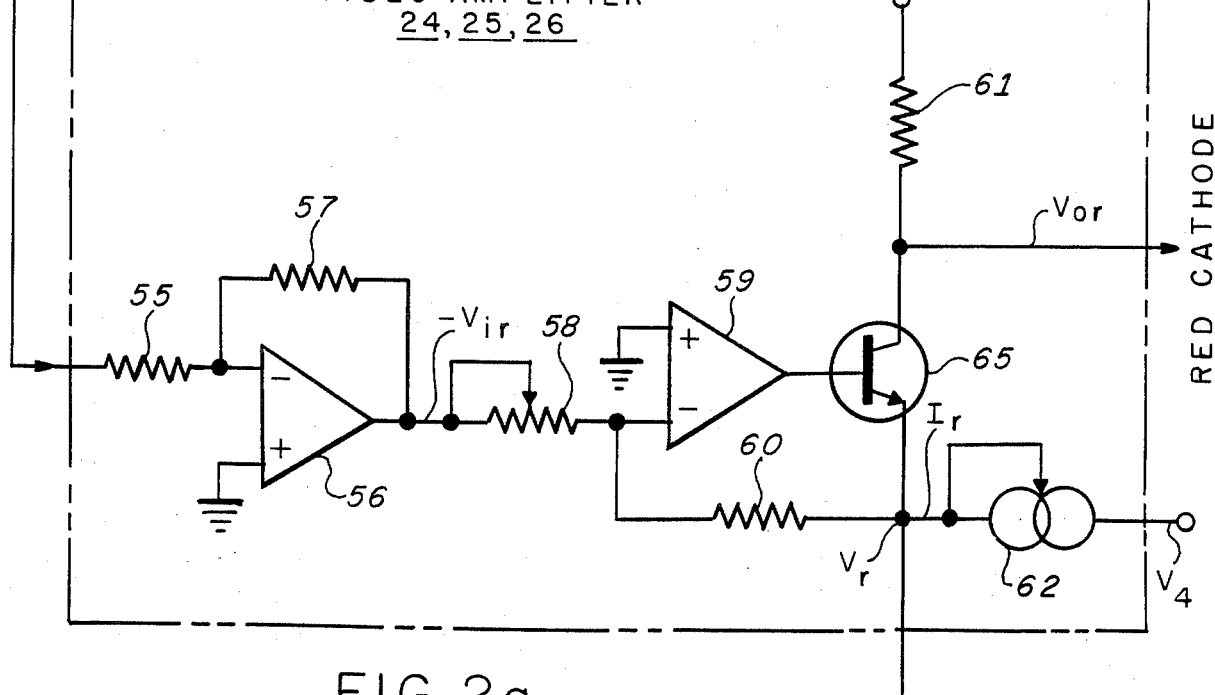
Figure 2B:
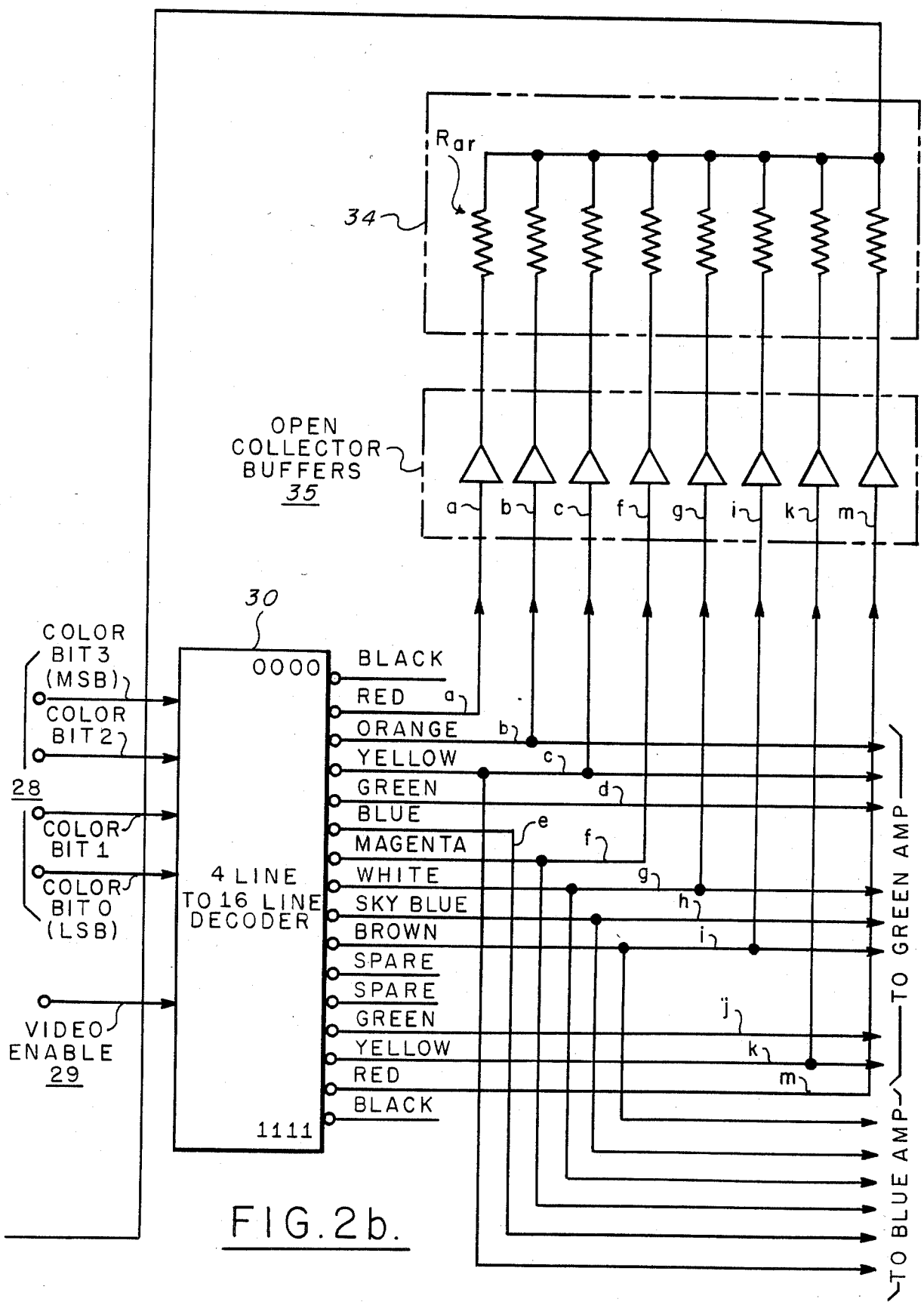

In the analog embodiment of this invention, wherein the red color gun circuit is shown in FIG. 2 in greater detail, circuits 31, 32, and 33 may consist of non-linear amplifiers providing an output responsive to the CRT gun gamma factor and further providing a squaring function. Each correction amplifier is preferably comprised of a logarithmic amplifier 50, a gain multiplier 51, 52, 53, and an anti-logarithmic amplifier 54. Amplifiers 51, 52, and 53 have gains adjusted to correspond to the individual gamma factor of the related color gun, while amplifiers 54 are substantially identical to each other with respect to gain characteristics.

Similar correction circuitry is provided for each of the primary colors red, green, and blue. The aforesaid corrected signals feed correspondingly into variable gain amplifiers 24, 25, and 26 which respectively provide signal outputs to the color cathodes 21, 22, and 23 of the CRT 20, as symbolized by $V_{or}$, $V_{og}$, and $V_{ob}$.

The input video color command 28, and 29 in digital form is received by decoder 30, processed through buffer 34, and directed to gain control network 35. Network 35 includes an array of resistors for each of the variable gain amplifiers 24, 25, and 26, which cooperate with the decoder 30 to vary the output levels $V_{or}$, $V_{og}$, $V_{ob}$, thereby driving the respective color cathodes to the relative brightness levels necessary for the formation of a predetermined hue.

Figure 6A:
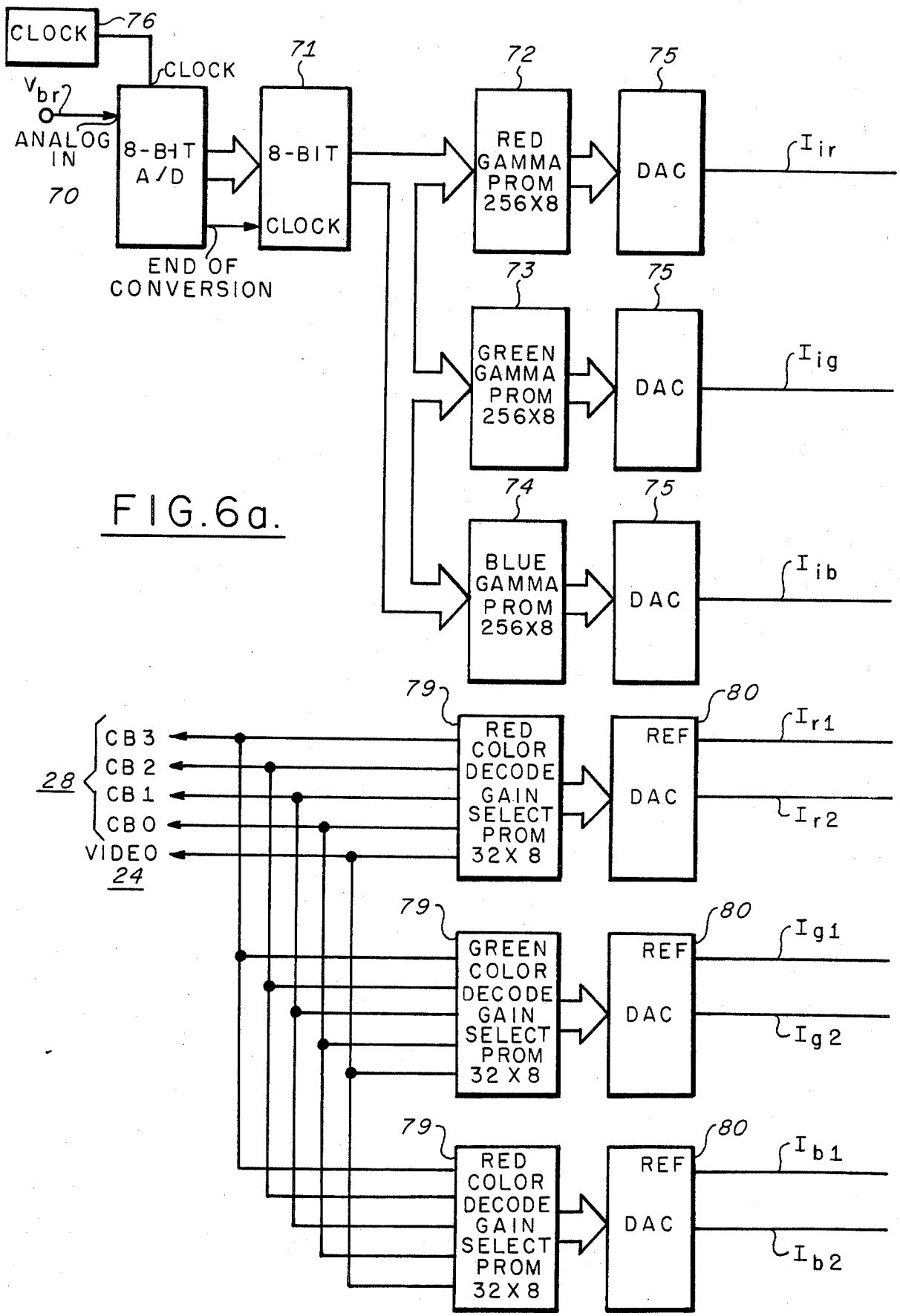
FIGS. 6a and b are diagrams showing a second embodiment of the invention, using a brightness and color tracking correction system of the digital type.
Figure 6B:
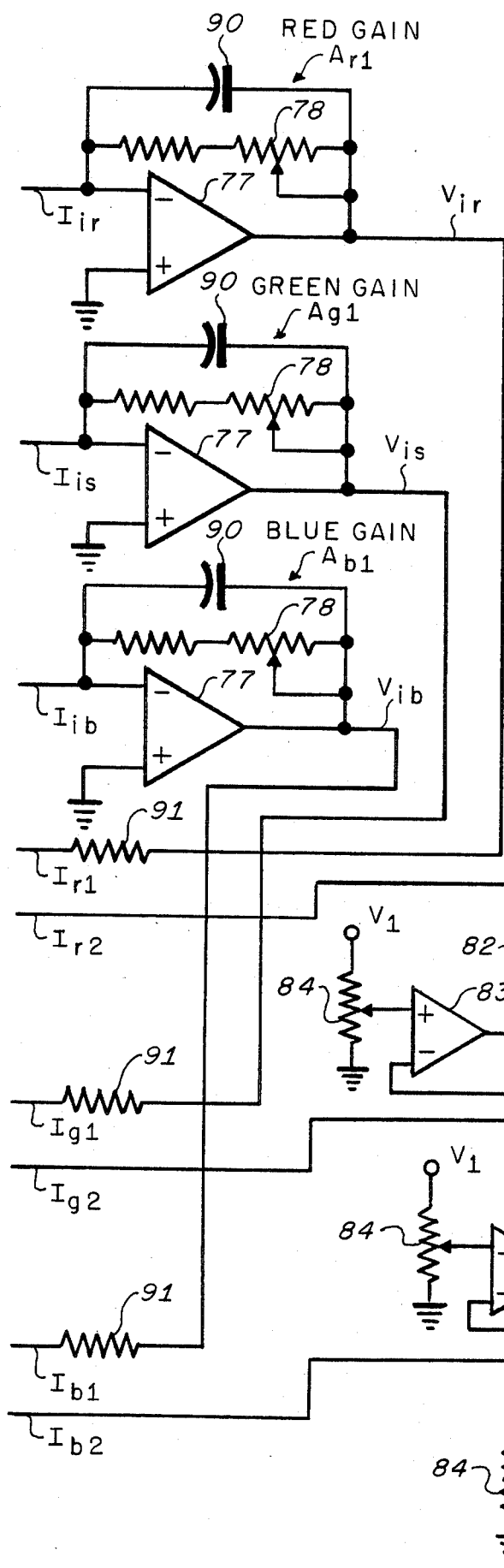
Figure 6B:
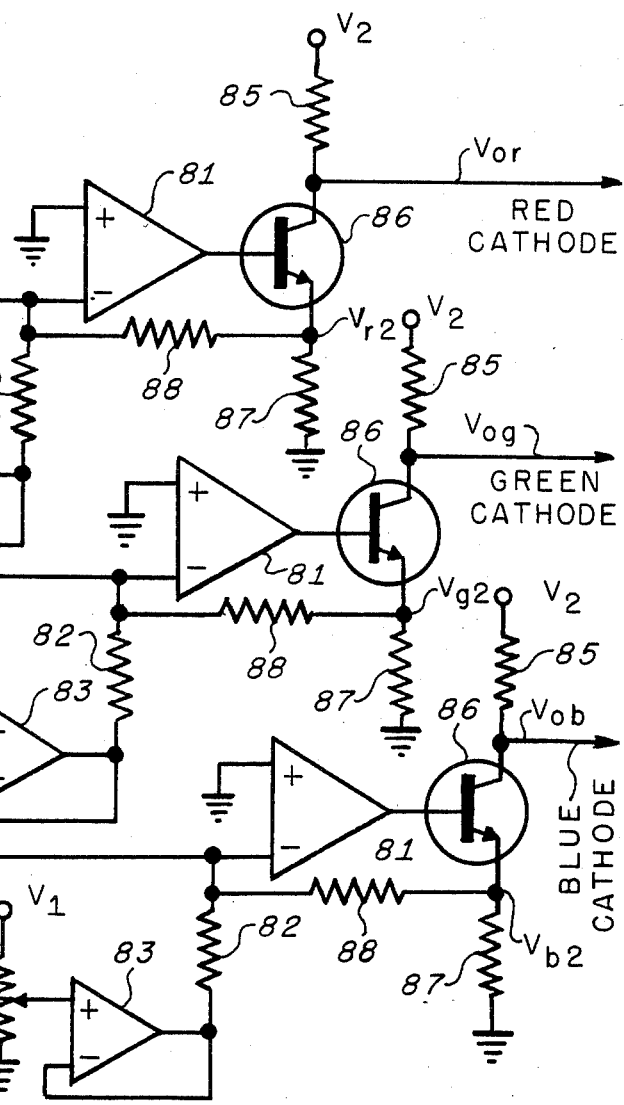

In the digital embodiment, as shown in FIG. 6, the buffered reference brightness signal $V_{br}$ is conducted to an eight-bit analog/digital (A/D) converter 70, whose output between sampling cycles is stored in a latch 71. Latch 71 output feeds an 8-bit bus which addresses red, green, and blue PROMs 72, 73, and 74, the PROMs being programmed for gamma/square correction as described below. A memory cell addressed in PROM 72, 73, and 74 is read out into corresponding eight-bit digital/analog converters 75, and there converted to analog form suitable for amplification, as shown typically by red amplifier 77. The analog output of amplifier 77, representing the corrected primary color brightness reference component in this embodiment, is then coupled to an eight-bit D/A converter 80, which is capable of operating at video switching rates. Color select PROM 79 has in memory the color gain factor corresponding to each selected color of the sixteen combinations of raster and stroke colors available. Since the proportions of primary colors for a resultant hue are fixed from tube-to-tube, no change in PROM 79 is required with variation on tube characteristics. Converter 80 provides an analog output which is proportional to the product of the analog equivalent output of PROM 79 and analog amplifier 77. Adjustable bias voltage from source $V_1$ and offset amplifier 83 feeds linear amplifier 81 through resistor 82 and thereby transistor 86 to set the cathode blanking level. The analog output from converter 80 also feeds the input node of amplifier 81 in common with bias amplifier 83, thus driving amplifier 86 to provide the resultant cathode energization $V_{or}$.

Returning now to FIG. 2, in which like numbers represent like or similar components, there is shown a composite block diagram and schematic of the analog brightness and tracking correction circuits 31, 32, and 33. The input $V_{br}$, which ranges between 1–10 VDC, is coupled into a logarithmic amplifier 50. Although only one such amplifier is required, individual amplifiers may be used for each color gun if desired. The output of logarithmic amplifier 50 is in turn coupled into linear amplifiers 51, 52, and 53. Note that three such linear amplifiers are required, one for each color gun, with their inputs paralleled. As will be outlined further, the gain of linear amplifiers 51, 52, and 53 is adjusted to be a numerical value equal to $2/\gamma$ for the gamma factor of a particular color gun, with $\gamma$ determined experimentally. The output of a linear amplifier 51, $-2/\gamma_r \log V_{br}$, for the color red, for example, is then directed to an inverse or antilog amplifier 54, one such amplifier being required for each color gun, and each coupled to its respective linear amplifier at the input. The output of antilog amplifiers 54, denoted by $V_{ir}$, $V_{ig}$, and $V_{ib}$, is then coupled into the corresponding variable gain video amplifiers 24, 25, and 26. Those skilled in the art will appreciate that one such amplifier must be used for each color gun although for purposes of clarity in presentation, only the red amplifier is shown herein. The red brightness signal $V_{ir}$ is then, for example, coupled into a linear amplifier 56, with resistor 55 interposed therebetween. Resistors 55 and 57 form a voltage divider thereby defining the gain of operational amplifier 56 as is well known in the art. Amplifier 56 is thereby adjusted for a suitable gain factor and by the phase inversion that occurs therein, provides an output $-V_{ir}$. Brightness control signal $-V_{ir}$ is now conducted through variable resistor 58. Resistor 58 in conjunction with resistor 60, serves to attenuate the input signal $-V_{ir}$ to any desired value. The output of linear operational amplifier 59 is coupled to the base of variable gain transistor amplifier 65. The collector of transistor 65 is biased through a dropping resistor 61, from voltage source $V_3$, typically of the order of 60–75 VDC. Supply voltage $V_3$ is selected to comport with the blanking voltage required at the color gun. Also tied to the collector of transistor 65 is an output line which feeds the cathode of the color gun, in the example shown $V_{or}$ for the red cathode 21. The emitter of transistor 65 is coupled to resistor 60 and also to variable current source 62 which is adjusted to provide a constant voltage bias across collector resistor 61. Constant current supply 62 may be powered by low voltage DC supply $V_4$, typically of the order of $-15$ VDC. After phase inversion and amplification, input voltage $-V_{ir}$ appears as voltage $V_r$ at the emitter of transistor 65. At this node, which is also connected to one end of resistor 60 and constant current source 62, the network 35 of fixed resistors of predetermined values is connected. These resistors are tied at their common node to the emitter of transistor 65, and at their individual ends to a network of corresponding buffer amplifiers 34, one buffer being provided for each control line a through m. The resistor $R_{ar}$ typically denotes one resistor in the network 35 which is used to determine the analog gain of the red color gun for a selected hue.

Figure 3:
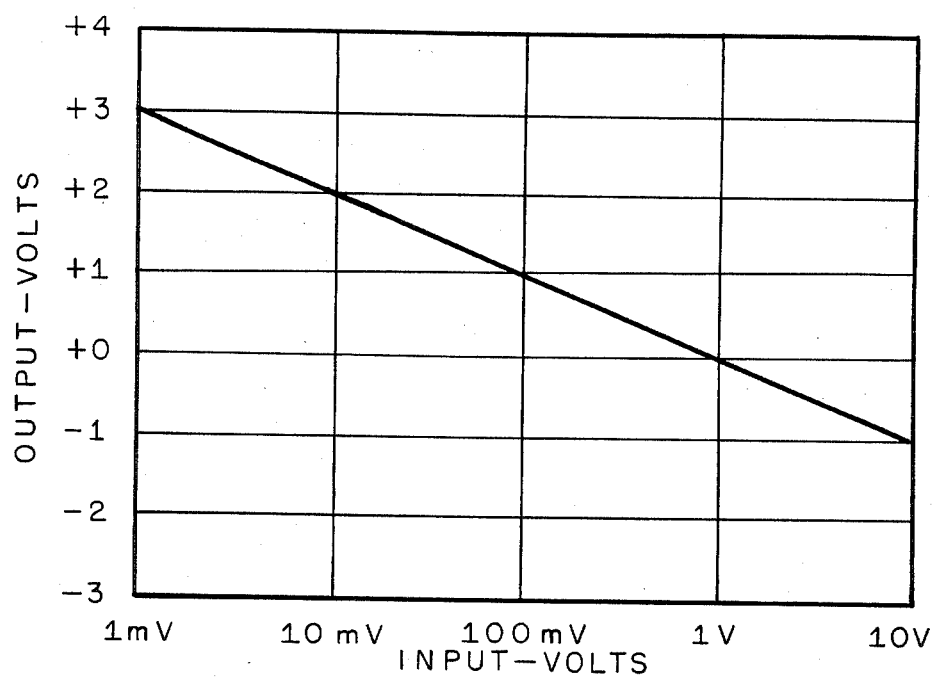
FIG. 3 is a characteristic gain curve showing typical output versus input voltage response for a logarithmic amplifier as used in the block diagram of FIG. 2.

Also shown in FIG. 2 is digital decoder 30. Receiving a video command 28 digitally encoded, typically in binary form, a group of four input bits denoted as color bit 0 through color bit 3 permits the selection of up to sixteen individual colors. The input video command 28, supplied by a digital symbol generator, not shown, determines which of the sixteen color hues will be selected. Each output of the decoder 30 is connected to a corresponding input of buffer array 34, the output of each buffer amplifier being directed to a corresponding resistor in network 35, as described above. Also shown is a digital video enable command 29, applied to the decoder strobe input. It is recalled that input voltage $V_{br}$ is a buffered DC voltage adjustable from 0 VDC to $+10$ VDC by means of the pilot's brightness control, typically a potentiometer. When $V_{br}$ is at 0 VDC, the CRT display will be fully blanked, while at $+10$ VDC it will be at maximum brightness. The logarithmic amplifier 50 has an output-voltage-to-input-voltage response of:

$$V_o = -\log V_{in} \tag{1}$$

so the output of the logarithmic amplifier is $-\log V_{br}$. This response is plotted in FIG. 3 where it may be seen that the output voltage of amplifier 50 varies in a straight line with the logarithm to the base 10 of the input voltage $V_{br}$. Referring again to FIG. 2, linear amplifiers 51, 52 and 53 are adjusted to provide a gain of $2/\gamma$, which for an individual color gun is approximately unity but may be greater than 1 or less than 1. The output of a linear amplifier is therefore the product of its gain factor $2/\gamma$ and the input voltage $-\log V_{br}$, or $-2/\gamma \log V_{br}$. Note that since the gamma factor varies with each color gun, the gain setting of each amplifier 51, 52, and 53 will not be identical. The output of a selected linear amplifier is then conducted to its corresponding anti-logarithmic amplifier 54, again there being provided an individual anti-logarithmic amplifier 54 for each of the color guns red, green, and blue. The amplifier 54 is designed, to have a characteristic $$V_{out} = 10^{-V_{in}} \tag{2}$$

Figure 4:
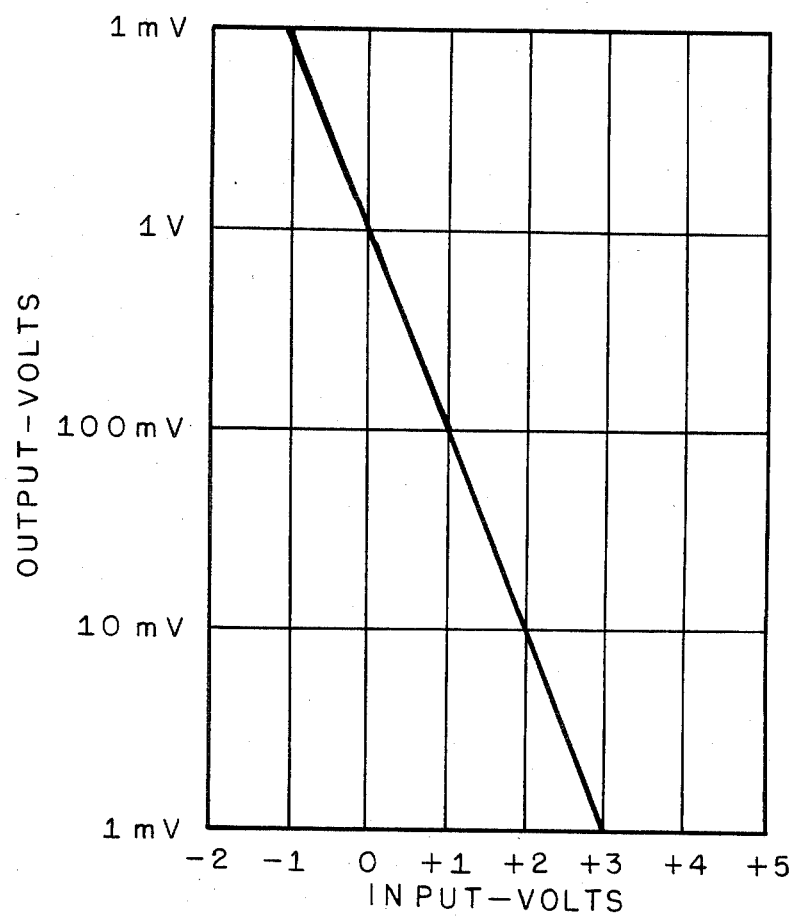
FIG. 4 is a characteristic gain curve showing the voltage response of an anti-logarithmic amplifier as used in the block diagram of FIG. 2.

The response is plotted in FIG. 4 in which the output voltage is now seen to be a straight line logarithmic function of the input voltage. By multiplying the input voltage $V_{br}$ by the gain factors of the logarithmic amplifier 50, linear amplifier 51, and anti-logarithmic amplifier 54, the output voltage $V_{ir}$ may be determined for the red color gun. Thus, $$V_{ir} = 10^{[(2/\gamma)(\log V_{br})]} \tag{3}$$

or $$V_{ir} = V_{br}^{2/\gamma r} \tag{4}$$

Similarly, the output voltages for the green color gun $V_{ig}$, and the blue color gun $V_{ib}$, may be shown to be $$V_{ig} = V_{br}^{2/\gamma g} \tag{5}$$

or $$V_{ib} = V_{br}^{2/\gamma b} \tag{6}$$

Of course, it will be apparent to those skilled in the art that the gamma factors and corresponding gain factors must be individually determined for each color gun. As a result of the above processing, $V_{ir}$, $V_{ig}$, and $V_{ib}$ are now corrected positive DC voltages within the range of approximately 0 VDC to $+10$ VDC. As may be seen from FIG. 2, the output of anti-logarithmic amplifier 54, is next directed to variable gain video amplifier 24, 25, and 26. Resistors 55 and 57 are selected to provide a suitable gain of linear amplifier 56 which after phase inversion provides an output $-V_{ir}$. The required gain of variable gain amplifier 24, 25, and 26 is a function of the desired output brightness and color selected. For example, referring to FIG. 9 for a raster display, brightness of 20 Foot-Lamberts for the red color gun requires a cathode modulation of 60 volts DC. Thus, the gain of multistage amplifier 24 must be adjusted to afford an output cathode energization of 60 volts DC or a proportionately lesser value for reduced brightness. The gain of intermediate amplifier 59 is determined by adjustable resistor 58 and by fixed resistor 60 in combination with a resistor selected from network 35, as follows: In the blanked state, the maximum gain of amplifier 59, denoted as $A_{r1}$, may be determined by:

$$V_r = A_{r1} V_{ir} \tag{7}$$

and $$A_{r1} = \frac{R_{60}(\Omega)}{R_{58}(\Omega)} \tag{8}$$

where resistor 60 has a maximum value preferably of the order of 100,000 ohms. Similarly, values of the amplifier gain will be predetermined by the resistor 58 in each color gun amplifier 25 and 26. Thus the overall gain function of each amplifier 59 is set by the corresponding variable resistor 58. The variable current source 62 is adjusted to provide a constant bias voltage across collector resistor 61 to set the blanking voltage level for each CRT cathode so that when the input brightness reference voltage is at zero, the display will be blanked; this value varies typically from +60 V to +75 VDC. Since the output of operational amplifier 59 is once again inverted, an increase in reference level $V_{br}$ will result in a reduction of cathode voltage from the blanking level which in turn increases display brightness. Thus, with an input at $V_{br}$ of 0 VDC, the output $V_{or}$ would be biased at approximately 60 VDC resulting in a fully dimmed display. With a brightness reference level $V_{br}$ of +10 VDC, the voltage $V_{or}$ will be reduced to a level less than 60 VDC, to a value determined in part by the gain of amplifier 65. Thus, by variably predetermining the gain of amplifier 24, 25, and 26 through selection of resistors in network 35, the relative brightness of the CRT color guns for a preselected color may be controlled in accordance with the input video color command.

It should be noted that all brightness correction and color tracking gains, voltages, and circuits discussed to this point are essentially low bandwidth and DC variables, operating at substantially less than video frequencies. The color select circuitry, however, must be capable of operating at the required video speed, wide bandwidth signal of 6–12 megaHertz, as will be discussed below.

Referring again to decoder 30 of FIG. 2, which may be a conventional hexadecimal decoder, the inputs are seen to comprise four color bits 28 and one video enable signal 29. When the video enable signal is low, all of the decoder outputs remain high. This results in all the buffer 34 outputs being high, or open circuited. The voltages at the three cathodes of the CRT are then determined by the preset blanking bias currents, $I_r$, $I_g$, and $I_b$, corresponding to each of the respective red, green, and blue color guns. In this condition, the voltage on all three color gun cathodes is at cutoff and the display is blank. When the video enable signal is high, then the remaining four color bit inputs may be used to prescribe a unique output of the 16 outputs a through m available from decoder 30. The selected decoder output is terminated to ground internal to the decoder, thus in turn grounding the gain-selector resistor of network 35 to which it is individually connected through buffer 34. When the input color bit signature is changed in response to a change in color command, there will be a corresponding change in the grounded resistor associated with network 34. The resulting change in amplifier gain will energize a color gun cathode in accordance with the desired relative brightness levels for a commanded color. For example, to select the color red, the binary color code 0001 is placed on color bits 3 through color bit 0 respectively, bit 3 representing the most significant color bit. As may be seen from FIG. 2, and FIG. 5, the stroke color red at decoder 30 corresponds to output line a which connects to resistor $R_{ar}$ of resistor network 35. Thus when decoder output a is forced low by the input command 28 and 29, resistor $R_{ar}$ is grounded at the end adjacent to the decoder. Since it is desired that only the red color gun be activated when the color red is selected, only resistor $R_{ar}$ will be grounded. The green, and blue amplifiers will be blanked. On the contrary, if an input color command for white is applied, where the color code is 0111, an appropriate gain-select resistor connected to terminal g of decoder 30 will be grounded at each of the three video amplifiers 65 since red, green, and blue must be combined to produce white. Thus, the decoder is designed to ground a selected resistor of the network 35 associated with each of the three video amplifiers 65. For a red rastor display, the resistor connected to decoder output k would be grounded. FIG. 5 shows a typical tabulation of interconnections between the decoder and the red, green, and blue resistor networks to produce the desired amplifier gain for each selected color.

The effect of terminating one of the selected resistors in network 35 to ground is to cause a corresponding change in the value of $V_{or}$ at the collector of transistor 65, the current gain of amplifier 65 being inversely proportional to the value of resistor $R_{ar}$. The resultant output voltage $V_{or}$ at the collector of transistor 65 may be expressed as follows:

$$V_{or} = A_{r2}V_r \tag{9}$$

Similarly $$V_{og} = A_{g2}V_g \tag{10}$$

and $$V_{ob} = A_{b2}V_b \tag{11}$$

The values for the required gain factors $A_{r2}$, $A_{g2}$, and $A_{b2}$ of the color video amplifiers 65 are shown in FIG. 5 for a representative range of desired colors and brightnesses. The cathode drive voltage from the blank level at the red color gun, $V_{or}$, for example, may be determined by multiplying the input signal $V_{ir}$ by the over-all gain of the variable gain amplifier 24. Thus, $$V_{or} = A_{r2}(A_{r1}V_{ir}) \tag{12}$$

or, substituting equation (4) for $V_{ir}$,
$$V_{or} = A_{r2}A_{r1}V_{br}2/\gamma r \tag{13}$$

Since the phosphor brightness follows the relationship $B = KV\gamma$, the resulting brightness of the red display may be expressed as a function of $\gamma$ and the amplifier gains:

$$B_r = K_r(A_{r1}A_{r2})^\gamma V_{br}^2 \tag{14}$$

Similarly, for the green and blue color guns. Thus, it is seen that the output brightness is, as desired, a function of the gamma coefficient and the square of the reference brightness voltage. It is clear that the variation from one display to another of gamma and the arbitrary gain factors $K_r$, $K_g$, and $K_b$ may be equalized by adjusting the gain set potentiometer 58 as shown in FIG. 2.

In another embodiment as shown in FIG. 6, the gamma and color tracking correction is accomplished by the use of digital circuitry. An advantage of this configuration is that it may be less sensitive to environmental changes such as variations in temperature which may cause instability in the logarithmic gain amplifiers used in the analog embodiment. Also as shown in FIGS. 9 and 10 the gamma relationship between drive voltage and brightness of the CRT may not be reducible to a simple exponential mathematical relationship as assumed in the analog embodiment. The use of a programmable memory results in more versatility and better color tracking, since compensation may be made for a variable gamma factor. As shown in FIG. 6, an input reference brightness display level, $V_{br}$, is coupled into eight-bit analog/digital converter 70. The output of A/D converter 70 is then directed to a corresponding eight-bit latch 71, which may be an octal flip-flop. The output bus of the latch 71 feeds three programmable read-only memories (PROM) 72, 73, and 74, one assigned to each of the respective primary phosphors red, green and blue. In the configuration shown, coverter 70 converts the input analog DC voltage $V_{br}$ to an eight-bit word; though a four-bit converter may be used if lesser resolution is acceptable, and more than eight-bits may be used for greater resolution. The memory arrays, PROMs 72, 73, and 74 are organized in an architecture of 256 eight-bit words. The data stored in a PROM at the selected address is then bussed to an eight-bit digital/analog converter 75, where the digital word is reconverted to analog form. A clock 76 provides inputs to the converter 70 and the latch 71 for controlling the sampling sequence. Details of the clock are not shown since it is of the type familiar to those skilled in the art, but it should be operated at a rate sufficient to avoid flicker. Also not shown are the positive and negative power supplies conventionally associated with the amplifier and control circuitry. The output current of converter 75 is then coupled into the input of current-to-voltage amplifier 77, which may incorporate a filter capacitor 90 to reduce flicker, similar amplifiers being provided for each color gun. Variable resistor 78, connected between the input and output of amplifier 77, acts to adjust the gain.

The input color command signal 28, 29 in binary form is applied to color select PROM 79 a, b, and c which must be of a type capable of operating at a video rate. Three such PROMs, one for each color gun, have their inputs connected in parallel to the aforesaid color command signal. The eight-bit output of a PROM 79 is referred to digital-to-analog converter 80, wherein is also coupled the outputs $V_{ir}$, $V_{ig}$, $V_{ib}$ respectively of amplifiers 77. The combined output voltage of a converter 80 then feeds an amplifier 81. Also connected to the same input of amplifier 81 through a resistor 82 is the output of a bias control amplifier 83, powered by DC source $V_1$ through an adjustable resistor 84. Cathode bias voltage $V_2$, approximately 70 VDC, applied through a resistor 85 to the collector of a transistor amplifier 86, sets a nominal blanking level voltage at the red cathode. Note that the circuit of amplifiers 81 and 86 is modified from that shown in FIG. 2. The blanking bias may be individually adjusted by varying resistor 84 feeding offset amplifier 83 to suit the particular color gun characteristics. The bias voltage at the cathode when modulated by the output $V_{or}$, $V_{og}$, and $V_{ob}$ of amplifiers 86 will determine the resultant cathode brightness.

It may be recalled that the input reference brightness voltage $V_{br}$ is a buffered voltage ranging from 0–10 VDC. This DC voltage is then converted into an eight-bit word by converter 70. Such eight-bit word, encoded in binary form, permits the resolution of 256 different codes of brightness levels. If, greater precision is required, this could be increased to ten or even twelve bits, at some increase in component complexity. Thus, when the input reference brightness voltage is 0 VDC, the output word is 00000000 or zero in decimal notation. When the input reference voltage is +10 VDC, the output word is 11111111, or 255 in decimal notation. The eight-bit word is used to address three read-only memories 72, 73, and 74, one for each color gun.

The PROMs 72, 73, and 74 must be capable of storing 256 eight-bit words. Converter 70 will address a particular memory location based on the applied analog voltage corresponding to the reference brightness level. The output word stored in memory must be proportional to the exponent $2\gamma$. For simplicity, let n be the number or output word stored at the address location m, where the output data is scaled from 0 to 255. Thus when m=0, n=0, and when m=255, n=255. Intermediate values of n between 0 and 255 will be scaled according to the proportionality factor $n=km^{2/\gamma}$. This procedure is permissible, since the gain of the amplifier can be set to give us the correct absolute value in the output. The value of k may be computed for any assumed factor of gamma by inserting the value of 255 for n=m, thus:

$$k = \frac{n}{m^{2/\gamma}} \quad (15)$$

or, for n=m=255, $$k = \frac{255}{255^{2/\gamma}} \quad (16)$$

FIG. 7 shows a sample table in which representative addresses are developed for the hypothetical red cathode with $\gamma=2.4$. To develop the data for each address of the PROM, for each incremental value of m from 0 to 255 compute the resultant factor $$n = 2.518 m^{0.833} \quad (17)$$

(where k=2.518) and round the result to the nearest integer. Thus, for example, at address m=3, the computed value of n is 6.281, and the value of the output data entered in the PROM is 6. If gamma for a particular color gun is found to be a variable, the value may be determined experimentally at each brightness level and accordingly stored as a modified factor to the accuracy desired.

Referring again to FIG. 6, the outputs of PROMs 72, 73, and 74 are read out by converters 75 in the form of an analog current ranging from 0 to 2 ma. Said outputs are then amplified by current-to-voltage amplifiers 77 with the resistors 78 adjusted to provide an output variable between approximately 7–12 VDC with $V_{br}=+10$ VDC. Thus, the input brightness reference level $V_{br}$ has been multiplied by the exponential $2/\gamma$ and the output, $V_{ir}$, is converted into voltages ranging from 0 to +10 VDC. Similar circuitry is applied to the outputs $V_{ig}$ and $V_{ib}$ for the green and blue color guns, respectively.

PROMs 79 are used to vary the cathode brightness levels in accordance with a predetermined table of brightness for each color hue. A PROM 79 has thirty-two addressable locations, of which sixteen are used for color selection, and the other sixteen are available for selecting an off or blanked condition. These are eight-bit output data lines, thus up to thirty-two eight-bit words may be stored and addressed. A particular memory location in each color select PROM 79 is addressed by the four-bit input video binary color command 28 and video enable 29, the inputs of the PROMs being connected in parallel to each of the command lines. Each memory location has stored therein a digital number corresponding to the desired color select gain factor.

FIG. 8 shows a proportionality factor C in analog form corresponding to the word stored at each address for reproducing a desired color, using a typical scaling factor $A_{r2} = V_{or}/V_{ir} = 0.031c$ to relate amplifier gain factor $A_{r2}$ to the decimal value stored in memory in binary form. There are thirty-two addressable locations, each of eight-bit word length. As noted heretofore, an eight-bit word permits resolution of 256 different brightness levels. Therefore, C ranges from 0 to 255. Amplifier 86 gain, typically an amplification of the order of 20, is determined by collector resistor 85 and emitter resistor 87. The voltages at the emitter of amplifier 86, $V_{r2}$, $V_{g2}$, and $V_{b2}$, are determined by the currents $I_{r2}$, $I_{g2}$, $I_{b2}$, respectively, flowing through resistors 88, connected betwen corresponding DAC 80 outputs and amplifier 86 emitters.

For example, for the color red, the output current of red DAC, $I_{r2}$, is found from $$I_{r2} = \frac{C}{255} I_{r1} \tag{18}$$

where C is the decimal value of the word addressed in PROM 79. The voltage $V_{r2}$ developed at the emitter of transistor 86 is determined by the current $I_{r2}$ through series resistor 88, which is preferably of the order of 2,000 ohms. DAC current $I_{r1}$ is determined by the voltage $V_{ir}$, $V_{ig}$, $V_{ib}$, applied to series resistor 91, which is preferably of the order of 5,000 ohms. Hence, typically, $$V_{r2} = 2{,}000\, I_{r2} = 2{,}000 \left( \frac{C}{255} \right) \frac{V_{ir}}{5{,}000} \tag{19}$$

which denotes the red phosphor energization as a function of the brightness variable C, which is predetermined by the color selected, as in FIG. 8. The transistor 86 from $V_{r2}$ to $V_{or}$ is determined by the ratio of collector bias resistor 85 to emitter bias resistor 87. If the gain factor $V_{or}/V_{r2}$ is conveniently selected to be 20, then the system gain factor $A_{r2}$ is found as $$A_{r2} = \frac{V_{or}}{V_{ir}} = (20)(2{,}000)\left(\frac{C}{255}\right)\left(\frac{1}{5{,}000}\right) = .031C \tag{20}$$

FIG. 8 shows a variable gain factor $A_{r2}$ which corresponds to the selected color component brightness for each input color command. Since the cathode voltage $V_{or}$, $V_{og}$, and $V_{ob}$ now depends on both the reference current $I_{r1}$, $I_{g1}$, $I_{b1}$, and on the number stored at the memory location addressed in PROM 79, there is provided an output voltage signal representing a brightness level modulated by the selected color cathode brightness level of FIG. 8 and the reference brightness control setting $V_{br}$. This signal is the desired cathode gun energization in accordance with the predetermined values.

Figure 11A:
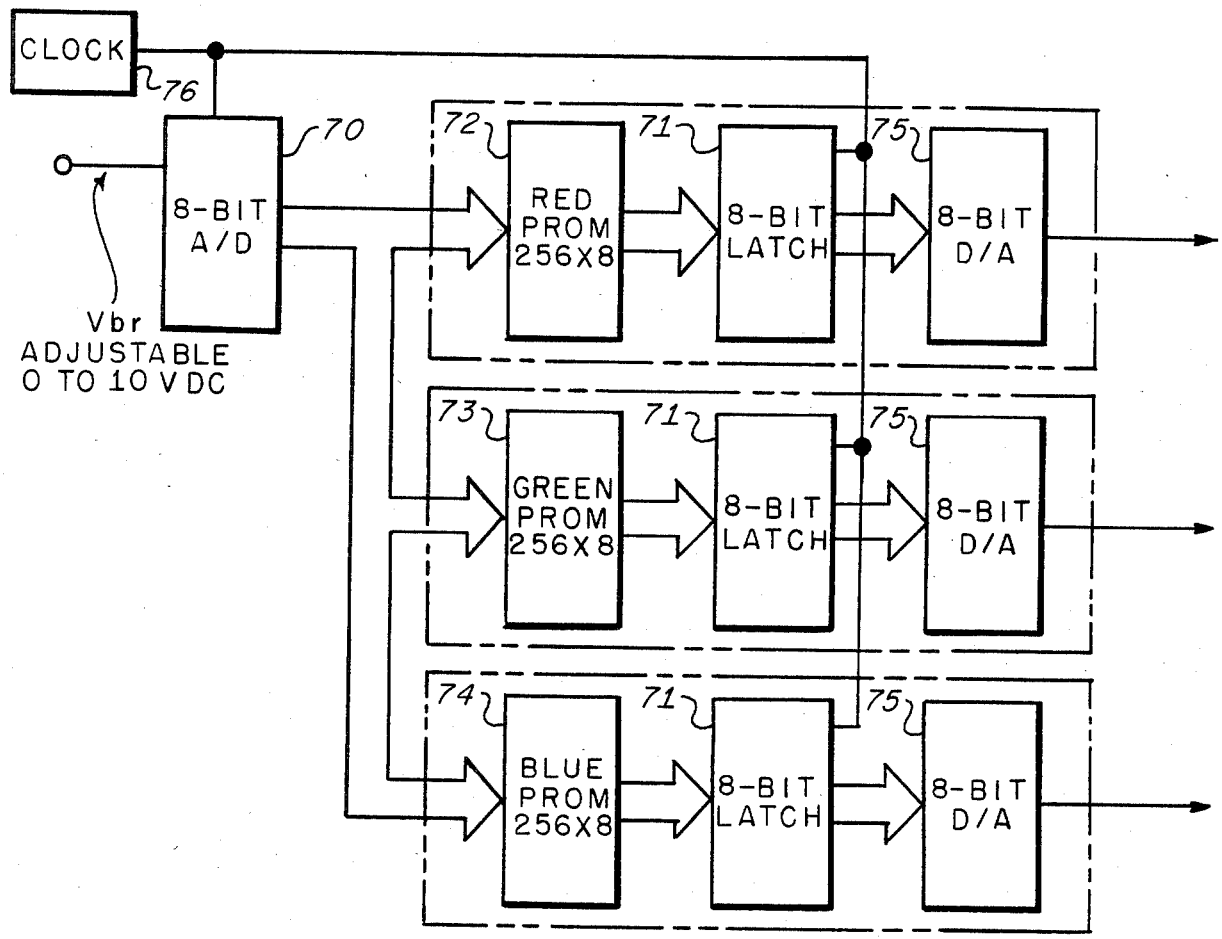
FIG. 11a and b are diagrams showing a hybrid embodiment of the invention, using digital brightness and color tracking correction and analog color selection.
Figure 11A:
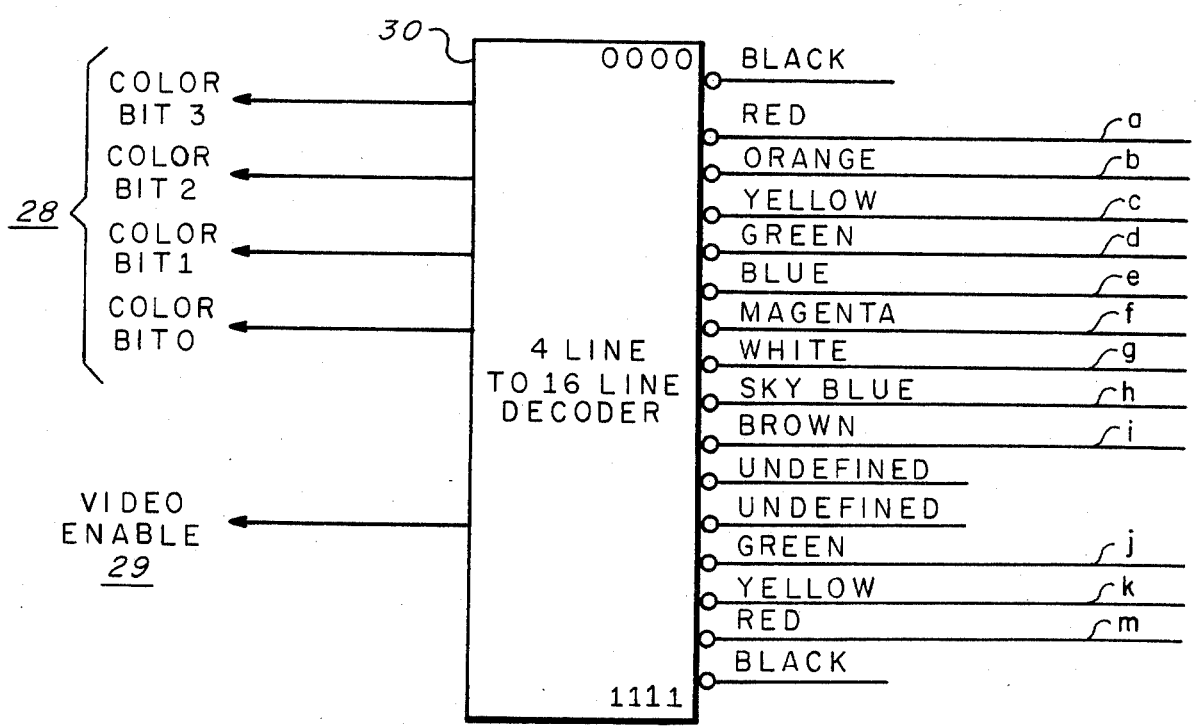
Figure 11B:
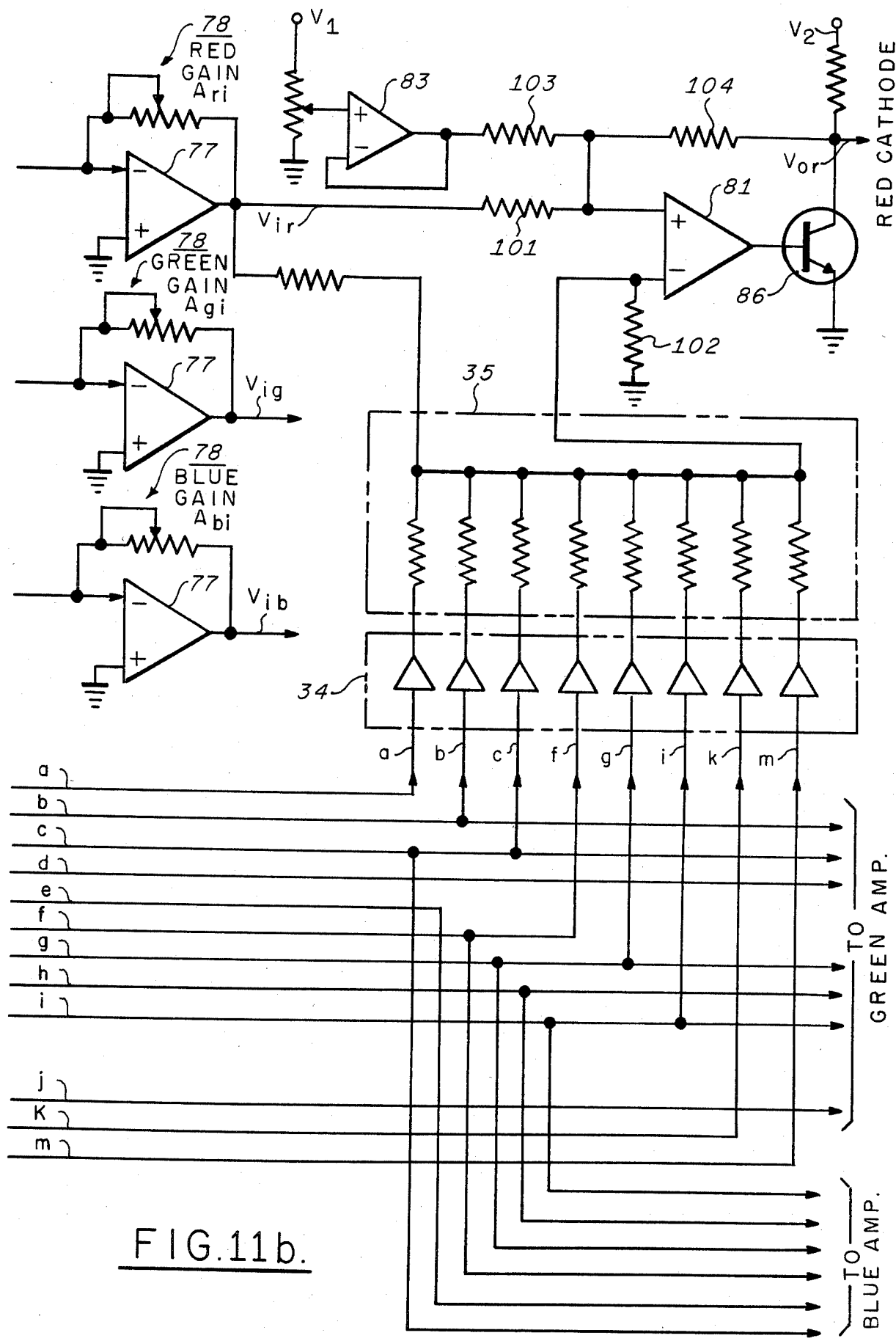

Another embodiment of the subject invention shown in FIG. 11, comprises a hybrid digital/analog configuration, wherein the gamma-square correction is accomplished in digital memory, and the color selection is provided by a variable gain linear amplifier, whose gain is varied by a color control decoder and resistor bias network, as in the analog system of FIG. 2. In this embodiment, the requisite linear amplifier gain factors would be determined by resistors whose values are preferably as shown in FIG. 12. Note that these values differ from FIG. 5, since the color amplifier circuits have a different configuration from the analog circuit of FIG. 2.

The digital section provides brightness and color tracking correction, similar to the corresponding all digital design of FIG. 6. It will be obvious to those skilled in the art that the corresponding elements perform similar functions. Thus, an input brightness reference signal $V_{br}$ is converted from analog to digital form in eight-bit A/D converter 70. The output bus feeds three color PROMs 72, 73, and 74 respectively. Each PROM has an appropriate correction factor stored at each location corresponding to a selected input brightness signal. At any setting of $V_{br}$, corresponding correction factors will be bussed to latches 71 and thence to eight-bit D/A converters 75. The corrected signal is then applied to the input of an amplifier 77. The gain of an amplifier 77 is adjustable by feedback potentiometer 78, and a resulting signal $V_{ir}$, $V_{ig}$, and $V_{ib}$ fed to the input of amplifier 81.

Color decoder 30 acts in a similar manner as described in conjunction with FIG. 6. While gain control network 35 is now applied to operational amplifier 81, rather than transistor amplifier 86, this is merely illustrative of manifold circuits to which the novel concept may be applied. Amplifier 81 combines the brightness and tracking signal $V_{ir}$, $V_{ig}$, $V_{ib}$ from amplifier 77 with the color selection signal from decoder 30. The combined signal, corrected for color, brightness and tracking, is then applied to the base of transistor amplifier 86, whereupon it is amplified sufficiently to traverse the brightness range from blanked to full output, and applied to the respective color cathodes.

It may be seen, therefore, that the novel signal conditioning circuits shown provide non-linear color gun brightness corrections depending on the gamma factor and proportional to the square of the input brightness reference voltage for each of the three color guns, all relatively low frequency circuits operating with minimal bandwidth requirements, while the color selection circuit, which is required to operate at video rates, acts only to vary the brightness in a linear manner. This approach considerably simplifies the circuit configurations that were used in the prior art where the reference brightness conditioning circuitry was also required to operate at video bandwidths, requiring complex mathematical correction circuitry.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. Color selection and brightness tracking control apparatus for a color cathode ray tube display system subjected to viewing under a wide range of ambient light conditions, comprising:
   (a) a color cathode ray tube responsive to video color commands having a display screen for emitting images in a plurality of different colors dependent upon the independent and variable energization of color gun cathode means for producing at least two independent primary colors, the relative brightness of which determine each of said plurality of colors, .
   (b) reference display brightness control means for providing a signal substantially independent of said video color commands for setting variable brightness energization levels over a range of desired brightness levels,
   (c) means responsive to a common signal from said reference display brightness control means for providing brightness control signals corresponding to each of the primary color emission characteristics of said color gun cathode means over said brightness range,
   (d) video color command means responsive to random on color command signals for producing at least one image to be displayed at a video frequency rate in at least one predetermined color comprised of components of said two primary colors at predetermined relative brightness levels, wherein said video color command operates at video frequency and said means for providing a brightness control signal operates at substantially less than said video frequency, and
   (e) combining means responsive to said video color command means and said brightness control signal for energizing said cathode means, thereby producing said predetermined color image at said reference brightness level.

2. An analog color selection and brightness tracking control apparatus as set forth in claim 1, wherein said means for providing brightness control signals comprises:
   (a) analog means for converting said reference display brightness energization of said brightness control means from a decimal value into an equivalent logarithmic signal, converting said logarithmic signal for brightness and color tracking by linear combination of logarithmic values and converting said converted logarithmic signal to an equivalent decimal value representing the cathode energization signal corresponding to each of said particular CRT color guns primary color emission characteristics over said brightness range,
   (b) first linear amplifier means for normalizing said cathode energization signal in decimal form to a predetermined gain factor
   (c) second linear amplifier means, responsive to said normalized cathode energization from said first linear amplifier means, and
   (d) said means responsive to said video color command means includes means for controlling the gain of said second linear amplifier in accordance with the independent cathode energization required to produce each of said predetermined colors for at least one said image.

3. The apparatus as described in claim 2, wherein said analog means for converting for brightness and color tracking further comprises a logarithmic amplifier, a linear amplifier with gain proportional to $2/\gamma$, and an anti-logarithmic amplifier, where $\gamma$ is a constant factor representing the manner in which the light intensity of a color gun phosphor varies in accordance with said cathode energization.

4. A hybrid color selection and brightness tracking control apparatus as set forth in claim 1, comprising:
   (a) means responsive to said reference display brightness signal from said brightness control means for converting from an analog signal to an equivalent digital form,
   (b) first memory means responsive to said reference brightness signal for storing the functional relationship $V = KV_{br2}/\gamma$ in digital form, representing the cathode energization data required to produce the primary color component brightness over the range of display brightness in at least one color gun, in accordance with the phosphor emission characteristics and color tracking characteristics of said color gun, where
      V = brightness reference signal corrected for phosphor characteristics and color tracking
      $V_{br}$ = uncorrected reference display by brightness level
      K = normalizing gain constant
      $\gamma$ = factor characterizing light intensity of a color gun phosphor
   (c) means for deriving from said memory means said cathode energization data in digital form,
   (d) means responsive to said digital cathode energization data for converting from digital form to analog form,
   (e) first linear amplifier means for normalizing said analog form of cathode energization data to a predetermined gain factor, and
   (f) second linear amplifier means, responsive to said normalized cathode energization data from said first amplifier means,
   (g) wherein said combining means responsive to said video color command means comprises means for controlling the gain of said second linear amplifier in accordance with the independent cathode energization required to produce each of said predetermined colors for at least one of said images.

5. The color and brightness tracking correction apparatus as set forth in claim 4 further comprising:
   (a) second memory means responsive to said video color command means for storing further cathode energization data in digital form representing the predetermined values of each of said primary color components for at least one color image, and
   (b) means for deriving from said first and said second memory means said cathode energization data in digital form.

6. The apparatus as described in claims 3 or 4 wherein said second linear amplifier means includes
   (a) transistor amplifier means having a collector and an emitter, provided with collector and emitter voltage bias means, said collector bias means also connected to said cathode means, and
   (b) means for varying said emitter bias by at least one gain select resistor having one end connected to said emitter, said resistor having an opposing end connected to and responsive to said video color command means, and said second linear amplifier having a gain inversely proportional to the magnitude of said gain select resistor.

7. The apparatus as set forth in claim 4 or 5, wherein said first memory means comprises at least one programmable read only memory with m addressable locations, corresponding to a respective plurality of CRT color gun brightness control settings, a number n being stored at each said location characterizing one of a plurality of brightness and color tracking correction factors, said number being characterized by the relation $$n = km^{2/\gamma}$$

where
- k = proportionally constant
- $\gamma$ = constant characterizing light intensity of a color phosphor.

8. The apparatus as described in claim 1, wherein said brightness control signals are calculated to correct for non-linear phosphor brightness response and color tracking, and are expressed in functional form as a gain coefficient having an exponent comprised of the quotient $2/\gamma$, wherein the $\gamma$ factor characterizes the absolute brightness of a color gun as a function of cathode energization.

9. A method of correcting a color cathode ray tube display instrument for phosphor brightness and color tracking, comprising:
  (a) applying a color command modulation signal at a video frequency rate,
  (b) applying a brightness and color tracking modulation signal at substantially less than said video frequency rate,
  (c) providing a brightness reference drive signal in accordance with a desired viewing brightness level,
  (d) correcting said reference signal by a gain factor representing the manner in which the light intensity of a color gun phosphor varies in accordance with the cathode energization required for brightness correction and color tracking and by the predetermined relative brightness of the primary color components which determine a plurality of colors, to obtain said brightness and color tracking modulation signal,
  (e) applying said corrected signal to a variable gain amplifier and
  (f) applying said color command video signal to said variable gain amplifier,
whereby the output of said variable gain amplifier provides cathode energization brightness correction and color tracking corresponding to said viewing brightness level, to the emissive character of the color gun phosphor, and to the selected color and displaying writing mode.

10. The method as set forth in claim 9, wherein said gain factor is obtained by:
  (a) storing a data base including a multiplicity of cathode drive excitations required to produce a corresponding plurality of brightnesses of each of said CRT color guns primary color emissions to correct for respective phosphor responses, said data base further corresponding to said brightness reference drive signal corrected for color tracking, and
  (b) applying at least one of said multiplicity of cathode drive excitations to said variable gain amplifier.

11. A method of correcting a color cathode ray tube (CRT) display instrument for phosphor brightness and color tracking, comprising:
  (a) applying a color command modulation signal at a video frequency rate,
  (b) applying a brightness and color tracking modulation signal at substantially less than said video frequency rate,
  (c) providing a brightness reference drive signal in accordance with at least one desired viewing brightness level,
  (d) storing a first data base including a multiplicity of cathode drive excitations required to produce a corresponding plurality of brightness of each of the CRT color guns primary color emissions, said data base further corresponding to said brightness reference drive signal corrected for phosphor brightness and color tracking,
  (e) storing a second data base including a multiplicity of cathode drive excitations corresponding to the predetermined relative brightness of the primary color components which determine a plurality of colors in the CRT display,
  (f) applying said color command video signal to said second data base for deriving the cathode energizations required to produce at least one of said plurality of colors, and
  (g) combining the cathode drive excitations of said first and second data bases to provide a single cathode drive modulation representing the cathode energization corrected for brightness and color tracking corresponding to the emissive character of each color gun phosphor and selected color and display writing mode.

12. The apparatus as described in claims 1, 9, 10, or 11 wherein said video command means commands a predetermined color for each of at least one of two images, one stroke written and one raster written.

* * * * *